US006924563B2

(12) United States Patent
Garces et al.

(10) Patent No.: US 6,924,563 B2
(45) Date of Patent: Aug. 2, 2005

(54) METHOD AND APPARATUS FOR CONTROLLING A MICROTURBINE

(75) Inventors: Luis Jose Garces, Niskayuna, NY (US); Mark Edward Cardinal, Altamont, NY (US); Gautam Sinha, Clifton Park, NY (US); Mark Edward Dame, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 480 days.

(21) Appl. No.: 10/160,788

(22) Filed: May 31, 2002

(65) Prior Publication Data

US 2003/0222458 A1 Dec. 4, 2003

(51) Int. Cl.[7] .................................................. F02G 5/00
(52) U.S. Cl. .......................... 290/40 A; 290/32; 322/10
(58) Field of Search ................................ 290/40 A, 32; 322/10, 12; 363/34

(56) References Cited

U.S. PATENT DOCUMENTS 4,754,607 A * 7/1988 Mackay ........................ 60/723
5,309,081 A * 5/1994 Shah et al. .................... 322/10
5,903,116 A * 5/1999 Geis et al. .................. 318/140
6,023,135 A 2/2000 Gilbreth et al.
6,031,294 A 2/2000 Geis et al.
6,064,122 A * 5/2000 McConnell .................. 290/32
6,072,302 A * 6/2000 Underwood et al. .......... 322/17
6,281,595 B1 * 8/2001 Sinha et al. .............. 290/40 A
6,380,719 B2 * 4/2002 Underwood et al. .......... 322/36
6,411,065 B1 * 6/2002 Underwood et al. .......... 322/20
6,437,535 B1 * 8/2002 Sinha ......................... 318/800
6,631,080 B2 * 10/2003 Trimble et al. ............... 363/34
6,664,653 B1 * 12/2003 Edelman ...................... 290/52

FOREIGN PATENT DOCUMENTS

JP 2002209400 A * 7/2002 ............. H02P/9/08

* cited by examiner

*Primary Examiner*—Joseph Waks
(74) *Attorney, Agent, or Firm*—Ann M. Agosti; Patrick K. Patnode

(57) ABSTRACT

An apparatus for controlling a microturbine, the apparatus including: a rectifier adapted for converting at least one generated voltage from the microturbine to a DC link voltage; an inverter adapted for converting the DC link voltage to at least one inverter output voltage, the at least one inverter output voltage being electrically coupled to an external power bus; a starter drive adapted for converting at least one starter input voltage to at least one starter output voltage, the at least one starter input voltage being electrically coupled to the external power bus, the at least one starter output voltage being electrically coupled to the microturbine.

20 Claims, 1 Drawing Sheet

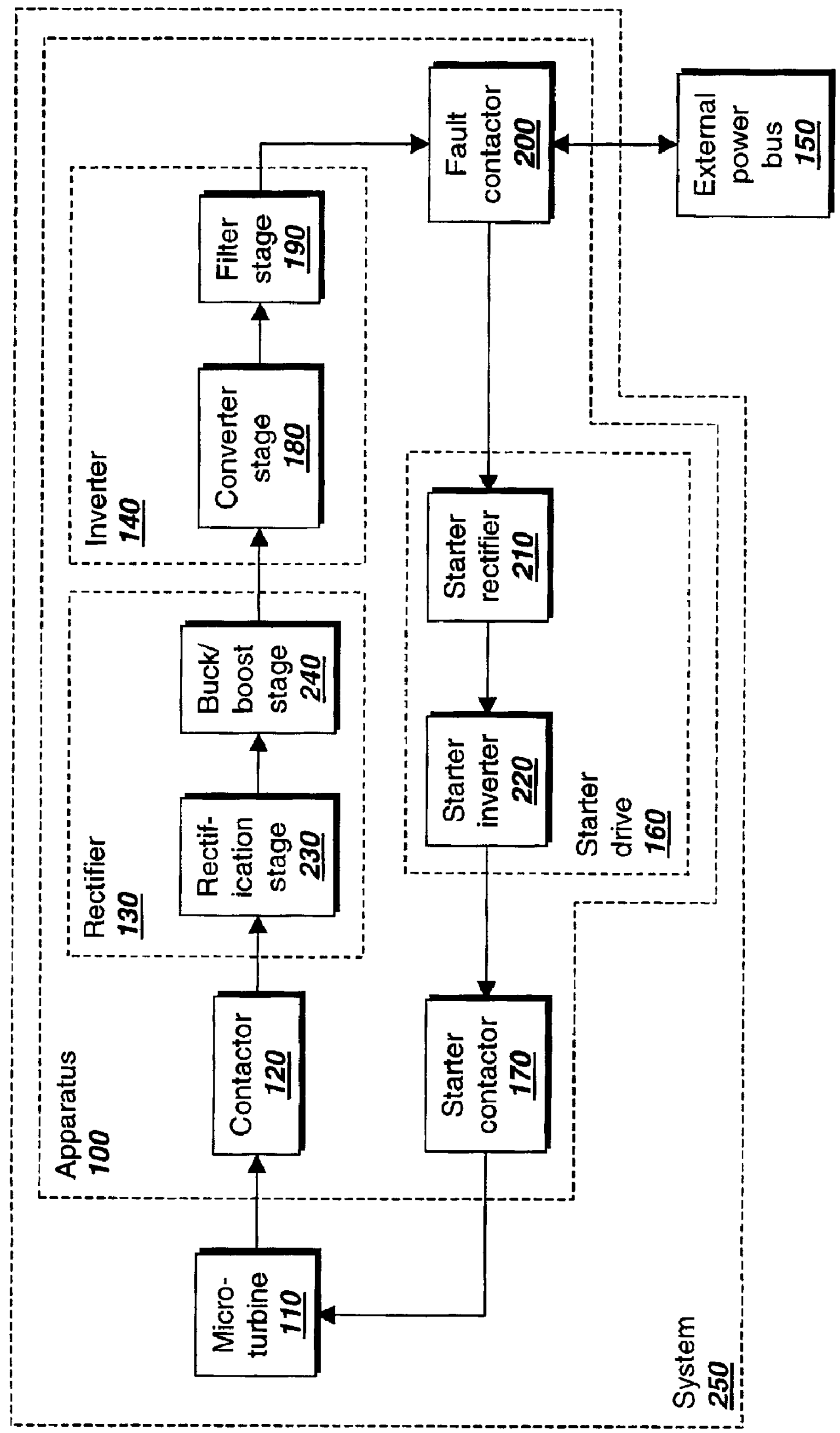
System 250
Apparatus 100
Micro-turbine 110
Contactor 120
Rectifier 130
Rectif-ication stage 230
Buck/boost stage 240
Inverter 140
Converter stage 180
Filter stage 190
Fault contactor 200
External power bus 150
Starter rectifier 210
Starter inverter 220
Starter drive 160
Starter contactor 170

METHOD AND APPARATUS FOR CONTROLLING A MICROTURBINE

STATEMENT OF FEDERAL SPONSORED RESEARCH

This invention was made with Government support under contract number DE-FC02-00CH11063 awarded by the United States Department of Energy. The Government has certain rights in the invention.

BACKGROUND

The present invention relates generally to the control of a microturbine and specifically to a control capable of starting the microturbine as well as matching the microturbine electrical output to an external power bus.

In a wide variety of applications, microturbines are used to provide power to an external power bus. The external power bus may be, for example, a national or regional power grid, or a more localized power distribution system such as, for example, a shipboard or aircraft power grid. The microturbine typically comprises a Brayton cycle engine prime mover mechanically coupled to an alternator with the alternator configured both to generate power and to serve as a starter motor for the engine.

At least two features distinguish the microturbine from other power generating systems. First, compared to larger gas turbine generating systems, the smaller microturbine runs at a substantially higher rotational speed and consequently generates power at an electrical frequency substantially higher than the usual 50 or 60 Hz of standard power grids. Second, compared to smaller household diesel generators, the larger microturbine is too unwieldy to start by hand. An opportunity exists, therefore, to provide a microturbine controller capable both of matching the microturbine electrical output to an external power bus and of driving the alternator as a starter motor from power derived from that same external power bus.

SUMMARY

The opportunity described above is addressed in one embodiment of the present invention by an apparatus for controlling a microturbine, the apparatus comprising: a rectifier adapted for converting at least one generated voltage from the microturbine to a DC link voltage; an inverter adapted for converting the DC link voltage to at least one inverter output voltage, the at least one inverter output voltage being electrically coupled to an external power bus; a starter drive adapted for converting at least one starter input voltage to at least one starter output voltage, the at least one starter input voltage being electrically coupled to the external power bus, the at least one starter output voltage being electrically coupled to the microturbine.

DRAWINGS

These and other features, aspects, and advantages of the present invention will become better understood when the following detailed description is read with reference to the accompanying drawings in which like characters represent like parts throughout the drawings, wherein:

The FIGURE illustrates a block diagram of an apparatus for controlling a microturbine in accordance with one embodiment of the present invention.

DETAILED DESCRIPTION

In accordance with one embodiment of the present invention, the FIGURE illustrates a block diagram of an apparatus 100 for controlling a microturbine 110, where apparatus 100 comprises a contactor 120, a rectifier 130, an inverter 140, a starter drive 160, and a starter contactor 170. During power generating operation, contactor 120 controllably electrically couples microturbine 110 to provide at least one generated voltage from microturbine 110; rectifier 130 converts the generated voltage to a DC link voltage; and inverter 140 converts the DC link voltage to at least one inverter output voltage which is electrically coupled to an external power bus 150. For starting operation, starter drive 160 converts at least one starter input voltage, electrically coupled to external power bus 150, to at least one starter output voltage, and starter contactor 170 controllably electrically couples the starter output voltage to the microturbine. Typically, contactor 120 is controlled to be in a decoupling state while starter contactor 170 is in a coupling state; conversely, starter contactor 170 is controlled to be in a decoupling state while contactor 120 is in a coupling state. In some embodiments, one or both of contactor 120 and starter contactor 170 are absent and inverter 140 and starter drive 160 are relied upon to control electrical power flow direction.

Microturbine 110 comprises any power generating system comprising a Brayton cycle engine mechanically coupled to an alternator wherein the alternator is configured both to generate power and to run as a starter motor for the Brayton cycle engine.

Contactor 120 and starter contactor 170 comprise any device or combination of devices capable of controllably electrically coupling and decoupling electrical devices; examples include, without limitation, mechanical contactors, mechanical relays, and solid state relays.

Rectifier 130 comprises any device or combination of devices capable of rectifying an AC (alternating current) voltage to produce a DC voltage; examples include, without limitation, uncontrolled devices including, without limitation, vacuum tube diode rectifiers and solid state diode rectifiers including, without limitation, semiconductor diodes, and combinations thereof, and controlled devices including, without limitation, insulated gate bipolar transistors (IGBTs), gate turn-off switches (GTOs), semiconductor controlled rectifiers (SCRs), field effect transistors (FETs), and combinations thereof.

Inverter 140 comprises any device or combination of devices capable of converting a DC input voltage into an AC output voltage; examples include, without limitation, switching device bridges and associated controllers where examples of switching devices include, without limitation, insulated gate bipolar transistors (IGBTs), gate turn-off switches (GTOs), field effect transistors (FETs), and combinations thereof.

External power bus 150 comprises any electrical power distribution system; examples include, without limitation, national or regional power grids, and localized power distribution systems such as, for example, shipboard or aircraft power grids.

Starter drive 160 comprises any device or combination of devices capable of being fed from a single phase or multiple phase AC voltage source and of generating at least one starter output voltage in such manner as to drive the alternator of microturbine 110 as a starter motor; examples include, without limitation, combinations of rectifiers and inverters, such as, for example, rectifier 130 and inverter 140, respectively.

In a more detailed embodiment in accordance with the embodiment of the FIGURE, inverter 140 further comprises a converter stage 180, and a filter stage 190. Converter stage 180 converts the DC link voltage to at least one unfiltered output voltage which filter stage 190 filters to produce the inverter output voltage. Typically, converter stage 180 comprises controlled switching devices and controllers as described for inverter 140 above. Filter stage 190 typically comprises passive reactive components such as, for example, inductors and capacitors.

In another more detailed embodiment in accordance with the embodiment of the FIGURE, apparatus 100 further comprises a fault contactor 200. Fault contactor 200 controllably electrically couples the external power bus to the inverter output voltage and the starter input voltage. When faults occur on external bus 150, fault contactor 200 is opened to isolate and protect apparatus 100. Examples of fault contactor 200 are the same as those of contactor 120 and starter contactor 170 described above.

In still another more detailed embodiment in accordance with the embodiment of the FIGURE, starter drive 160 further comprises a starter rectifier 210 and a starter inverter 220. In operation, starter rectifier 210 converts the starter input voltage to a starter link voltage, and starter inverter 220 converts the starter link voltage to the starter output voltage. Examples of starter rectifier 210 and starter inverter 220 include, without limitation, those examples described above for rectifier 130 and inverter 140, respectively.

In yet another more detailed embodiment in accordance with the embodiment of the FIGURE, rectifier 130 further comprises a rectification stage 230 and a buck/boost stage 240. In operation, rectification stage 230 converts the generated voltage from microturbine 110 to an intermediate DC voltage which buck/boost stage 240 converts to the DC link voltage. Rectification stage 230 typically comprises a passive rectifier bridge; buck/boost stage 240 comprises an active DC-to-DC converter to either decrease (buck) or increase (boost) the intermediate DC voltage to produce the DC link voltage.

In another embodiment in accordance with the embodiment of the FIGURE, a system 250 comprises microturbine 110 and apparatus 100.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for controlling a microturbine, said apparatus comprising:

a microturbine rectifier adapted for converting at least one generated voltage from said microturbine to a DC link voltage;

a microturbine inverter adapted for converting said DC link voltage to at least one inverter output voltage, said at least one inverter output voltage being electrically coupled to an external power bus;

a starter drive adapted for converting at least one starter input voltage to at least one starter output voltage, said at least one starter input voltage being electrically coupled to said external power bus, said at least one starter output voltage being electrically coupled to said microturbine, said starter drive comprising a starter rectifier adapted for converting said at least one starter input voltage to a starter link voltage and a starter inverter adapted for converting said starter link voltage to said at least one starter output voltage, said starter inverter not comprising said microturbine inverter.

2. The apparatus of claim 1 further comprising a contactor adapted for controllably electrically coupling said microturbine to provide said at least one generated voltage from said microturbine.

3. The apparatus of claim 1 further comprising a starter contactor adapted for controllably electrically coupling said at least one starter output voltage to said microturbine.

4. The apparatus of claim 1 wherein said microturbine inverter further comprises:

a converter stage adapted for converting said DC link voltage to at least one unfiltered output voltage; and a filter stage adapted for filtering said at least one unfiltered output voltage to produce said at least one inverter output voltage.

5. The apparatus of claim 1 further comprising a fault contactor adapted for controllably electrically coupling said external power bus to said at least one inverter output voltage and said at least one starter input voltage.

6. The apparatus of claim 1 wherein said microturbine rectifier further comprises:

a rectification stage adapted for converting said at least one generated voltage to an intermediate DC voltage; and a buck/boost stage adapted for converting said intermediate DC voltage to said DC link voltage.

7. An apparatus for controlling a microturbine, said apparatus comprising:

a microturbine rectifier adapted for converting at least one generated voltage from said microturbine to a DC link voltage;

a microturbine inverter adapted for converting said DC link voltage to at least one inverter output voltage, said at least one inverter output voltage being electrically coupled to an external power bus;

a starter drive adapted for converting at least one starter input voltage to at least one starter output voltage, said at least one starter input voltage being electrically coupled to said external power bus, said at least one starter output voltage being electrically coupled to said microturbine, said starter drive comprising a starter rectifier adapted for converting said at least one starter input voltage to a starter link voltage and a starter inverter adapted for converting said starter link voltage to said at least one starter output voltage, said starter inverter not comprising said microturbine inverter;

a contactor adapted for controllably electrically coupling said microturbine to provide said at least one generated voltage from said microturbine; and a starter contactor adapted for controllably electrically coupling said at least one starter output voltage to said microturbine.

8. The apparatus of claim 7 wherein said microturbine inverter further comprises:

a converter stage adapted for converting said DC link voltage to at least one unfiltered output voltage; and a filter stage adapted for filtering said at least one unfiltered output voltage to produce said at least one inverter output voltage.

9. The apparatus of claim 7 further comprising a fault contactor adapted for controllably electrically coupling said external power bus to said at least one inverter output voltage and said at least one starter input voltage.

10. The apparatus of claim 7 wherein said microturbine rectifier further comprises:

a rectification stage adapted for converting said at least one generated voltage to an intermediate DC voltage; and a buck/boost stage adapted for converting said intermediate DC voltage to said DC link voltage.

11. A system comprising:

a microturbine;

a microturbine rectifier adapted for converting at least one generated voltage from said microturbine to a DC link voltage;

a microturbine inverter adapted for converting said DC link voltage to at least one inverter output voltage, said at least one inverter output voltage being electrically coupled to an external power bus;

a starter drive adapted for converting at least one starter input voltage to at least one starter output voltage, said at least one starter input voltage being electrically coupled to said external power bus, said at least one starter output voltage being electrically coupled to said microturbine, said starter drive comprising a starter rectifier adapted for converting said at least one starter input voltage to a starter link voltage and a starter inverter adapted for converting said starter link voltage to said at least one starter output voltage, said starter inverter not comprising said microturbine inverter.

12. The system of claim 11 further comprising a contactor adapted for controllably electrically coupling said microturbine to provide said at least one generated voltage from said microturbine.

13. The system of claim 11 further comprising a starter contactor adapted for controllably electrically coupling said at least one starter output voltage to said microturbine.

14. The system of claim 11 wherein said microturbine inverter further comprises:

a converter stage adapted for converting said DC link voltage to at least one unfiltered output voltage; and a filter stage adapted for filtering said at least one unfiltered output voltage to produce said at least one inverted output voltage.

15. The system of claim 11 further comprising a fault contactor adapted for controllably electrically coupling said external power bus to said at least one inverter output voltage and said at least one starter input voltage.

16. The system of claim 11 wherein said microturbine rectifier further comprises:

a rectification stage adapted for converting said at least one generated voltage to an intermediate DC voltage; and a buck/boost stage adapted for converting said intermediate DC voltage to said DC link voltage.

17. A system comprising:

a microturbine;

a microturbine rectifier adapted for converting at least one generated voltage from said microturbine to a DC link voltage;

a microturbine inverter adapted for converting said DC link voltage to at least one inverter output voltage, said at least one inverter output voltage being electrically coupled to an external power bus;

a starter drive adapted for converting at least one starter input voltage to at least one starter output voltage, said at least one starter input voltage being electrically coupled to said external power bus, said at least one starter output voltage being electrically coupled to said microturbine, said starter drive comprising a starter rectifier adapted for converting said at least one starter in voltage to a starter link voltage and a starter inverter adapted for converting said starter link voltage to said at least one starter output voltage, said starter inverter not comprising said microturbine inverter;

a contactor adapted for controllably electrically coupling said microturbine to provide said at least one generated voltage from said microturbine; and a starter contactor adapted for controllably electrically coupling said at least one starter output voltage to said microturbine.

18. The system of claim 17 wherein said microturbine inverter further comprises:

a converter stage adapted for converting said DC link voltage to at least one unfiltered output voltage; and a filter stage adapted for filtering said at least one unfiltered output voltage to produce said at least one inverter output voltage.

19. The system of claim 17 further comprising a fault contactor adapted for controllably electrically coupling said external power bus to said at least one inverter output voltage and said at least one starter input voltage.

20. The system of claim 17 wherein said microturbine rectifier further comprises:

a rectification stage adapted for converting said at least one generated voltage to an intermediate DC voltage; and a buck/boost stage adapted for converting said intermediate DC voltage to said DC link voltage.

* * * * *